(12) United States Patent
Waage

(10) Patent No.: US 10,760,016 B2
(45) Date of Patent: Sep. 1, 2020

(54) INCLINED ROTARY GASIFIER WASTE TO ENERGY SYSTEM

(71) Applicant: THE RESEARCH FOUNDATION OF STATE UNIVERSITY OF NEW YORK, Albany, NY (US)

(72) Inventor: David J. Waage, Cobleskill, NY (US)

(73) Assignee: The Research Foundation of State University of New York, Albany, NY (US)

( * ) Notice: Subject to any disclaimer, the term of this patent is extended or adjusted under 35 U.S.C. 154(b) by 574 days.

(21) Appl. No.: 15/305,985

(22) PCT Filed: Apr. 21, 2015

(86) PCT No.: PCT/US2015/026854
§ 371 (c)(1),
(2) Date: Oct. 21, 2016

(87) PCT Pub. No.: WO2015/164361
PCT Pub. Date: Oct. 29, 2015

(65) Prior Publication Data
US 2017/0044450 A1    Feb. 16, 2017

Related U.S. Application Data

(60) Provisional application No. 61/983,697, filed on Apr. 24, 2014, provisional application No. 62/118,458, filed on Feb. 19, 2015.

(51) Int. Cl.
*C10J 3/00* (2006.01)
*C01B 3/02* (2006.01)
*C10J 3/84* (2006.01)

(52) U.S. Cl.
CPC .............. *C10J 3/005* (2013.01); *C01B 3/02* (2013.01); *C10J 3/845* (2013.01);
(Continued)

(58) Field of Classification Search
CPC .............. C10J 3/005; C10J 2200/154; C10J 2300/0923; C10J 2300/0926; C10J 2300/0946; C10J 3/845; C01B 3/02
See application file for complete search history.

(56) References Cited

U.S. PATENT DOCUMENTS 5,363,779 A * 11/1994 Bury ................... B22C 5/08
                                                    110/236
5,776,335 A *  7/1998 Overath ............. B01D 24/12
                                                   210/167.21
(Continued)

FOREIGN PATENT DOCUMENTS

BR    PI 0711548-2 A2    3/2012
WO    2007/037768 A1     4/2007
(Continued)

OTHER PUBLICATIONS

International Search Report and Written Opinion of the International Searching Authority, dated Jul. 2, 2015, and completed on Jun. 9, 2015, for corresponding PCT International Application No. PCT/US2015/026854.
(Continued)

*Primary Examiner* — Paul A Wartalowicz
(74) *Attorney, Agent, or Firm* — Heslin Rothenberg Farley & Mesiti P.C.; Victor A. Cardona, Esq.

(57) ABSTRACT

A gasifier system includes a reactor for receiving a wet feedstock which has a base and a container rotatably connected to the base such that a rotation of the container causes a mixing of the feedstock in an interior of the reactor. The interior is bounded by the base and the container. A space between the base and the container allows an entry of oxygen into the interior. The space has a dimension such that the feedstock is fully oxidized in a combustion area adjacent the base and such that the feedstock avoids combustion in a remainder of the interior. The reactor has a longitudinal axis
(Continued)

inclined at an inclination angle relative to a horizontal line to promote the mixing of the feedstock in the interior.

12 Claims, 15 Drawing Sheets

(52) U.S. Cl.
CPC .. *C10J 2200/154* (2013.01); *C10J 2300/0923* (2013.01); *C10J 2300/0926* (2013.01); *C10J 2300/0946* (2013.01); *C10J 2300/0956* (2013.01); *C10J 2300/0959* (2013.01); *C10J 2300/0973* (2013.01); *C10J 2300/1246* (2013.01); *C10J 2300/165* (2013.01); *C10J 2300/1643* (2013.01); *C10J 2300/1807* (2013.01); *Y02E 20/18* (2013.01)

(56) References Cited

U.S. PATENT DOCUMENTS

| | | |
|---|---|---|
| 5,895,507 A | 4/1999 | Southards |
| 7,638,070 B2 | 12/2009 | Johnson et al. |
| 7,857,995 B2 | 12/2010 | Johnson et al. |
| 7,968,006 B2 | 6/2011 | Johnson et al. |
| 8,017,040 B2 | 9/2011 | Johnson et al. |
| 8,017,041 B2 | 9/2011 | Johnson et al. |
| 8,021,577 B2 | 9/2011 | Johnson et al. |
| 8,197,698 B2 | 6/2012 | Johnson et al. |
| 2006/0180459 A1 | 8/2006 | Bielenberg |
| 2006/0269461 A1* | 11/2006 | Scanlon .................. B01J 8/008 422/218 |
| 2007/0294937 A1 | 12/2007 | Stein |
| 2008/0021123 A1 | 1/2008 | Norbeck et al. |
| 2009/0007488 A1 | 1/2009 | Schmidt |
| 2009/0119991 A1 | 5/2009 | Johnson et al. |
| 2009/0119992 A1 | 5/2009 | Johnson et al. |
| 2009/0119994 A1 | 5/2009 | Johnson et al. |
| 2009/0126270 A1 | 5/2009 | Johnson et al. |
| 2009/0126276 A1 | 5/2009 | Johnson et al. |
| 2009/0183430 A1 | 7/2009 | Schubert et al. |
| 2009/0293360 A1 | 12/2009 | Kim |
| 2009/0311092 A1 | 12/2009 | De Broqueville |
| 2010/0078305 A1* | 4/2010 | McKnight .............. C10B 55/10 201/31 |
| 2011/0220584 A1 | 9/2011 | Johnson et al. |
| 2011/0266142 A1* | 11/2011 | Norman .................. C25B 1/12 204/257 |
| 2012/0096768 A1 | 4/2012 | Johnson et al. |
| 2013/0240344 A1 | 9/2013 | Johnson et al. |
| 2014/0048719 A1 | 2/2014 | Johnson et al. |

FOREIGN PATENT DOCUMENTS

| | | |
|---|---|---|
| WO | 2007/121268 A2 | 10/2007 |
| WO | 2009/094535 A2 | 7/2009 |

OTHER PUBLICATIONS

PCT/IB/326 mailed on Nov. 3, 2016, including PCT/IB/373 International Preliminary Report on Patetnability dated Oct. 25, 2016, and PCT/ISA/237 Written Opinion of the International Searching Authority, dated Jul. 2, 2015, and completed on Jun. 9, 2015, for corresponding PCT International Application No. PCT/US2015/026854.

* cited by examiner

Standard Mix Gasifier Feed Proportions with Moisture Contents

| No. | Feedstock Type | Description | Component % Wet Basis | Pro Rated Moisture | Wet Feed Rate, lbs/hr |
|---|---|---|---|---|---|
| 1 | Cardboard | OCC, corrugated | 15% | 1.2% | 14.6 |
| 2 | Mixed Paper | Office, news, any mixed clean paper | 15% | 1.2% | 14.6 |
| 3 | HDPE | Plastic | 6% | 0.0% | 5.8 |
| 4 | PET | Plastic | 6% | 0.0% | 5.8 |
| 5 | PP | Plastic | 6% | 0.0% | 5.8 |
| 6 | Food | Campus Cafeteria Food Waste | 20% | 15.8% | 19.4 |
| 7 | Wood | Plywood, construction waste wood | 24% | 9.4% | 23.3 |
| 8 | Inerts | Metals, glass | 4% | 0.0% | 3.9 |
| 9 | Textiles | Polyester blends and cotton | 4% | 0.3% | 3.9 |
|  | Totals = |  | 100% | 28.0% | 97.2 |

*FIG. 9*

INCLINED ROTARY GASIFIER WASTE TO ENERGY SYSTEM

RELATED APPLICATIONS

This application is a 371 National Phase of PCT/US2015/026854 filed on Apr. 21, 2015, which claims priority to U.S. Provisional Application No. 61/983,697, filed Apr. 24, 2014, entitled INCLINED ROTARY GASIFIER WASTE TO ENERGY SYSTEM, and U.S. Provisional Application No. 62/118,458 filed on Feb. 19, 2015 entitled INCLINED INDIRECT FLAMING PYROLYSIS ROTARY GASIFIER (IIFPRG) FOR WASTE TO ENERGY APPLICATIONS, the entire disclosures of which are incorporated herein by reference.

GOVERNMENT RIGHTS STATEMENT

The invention disclosed herein was made at least in part with funding by the U.S. Government, specifically the United States Department of the Army under grant number W15QKN-08-1-0001. Therefore, the U.S. Government has certain rights in this invention.

TECHNICAL FIELD

The present invention relates generally to waste to energy systems, and more particularly to systems and methods for converting a wet feedstock into a fuel.

BACKGROUND

Waste to energy systems may be utilized to generate electricity, reduce a volume of waste or both. Such systems may rely on combustion to reduce a volume of waste while creating heat which may be used to generate steam and drive a turbine for generating electricity, for example. Gasification apparatus may also be used to generate synthetic gas from solid or liquid waste that may be used to fuel electrical generators, gas turbines, internal combustion engines, fuel cells, and combustion boilers, for example.

Waste to energy systems have been utilized for converting wet and dry wastes to electricity. Such waste to energy systems have been found to be particularly valuable in forward military applications where both facilities for waste disposal and fuel to drive electrical generators are in short supply. For example, waste to energy systems and methods may replace burn pits while reducing the use of liquid diesel fuel to generate electricity for military applications.

One example of a waste to energy system is a gasifier or reactor which inputs wet flammable waste and outputs synthetic gas among other things (e.g., oils, tar, ash and carbon black). Reactors may include rotating portions which receive the wastes and may be oriented horizontally but most often are configured as vertical columns and include various fixed bed or fluidized systems. Typical bed designs include fluidized bed, entrained bed, downdraft gasifier, and updraft gasifier. All of these configurations require, to varying degrees, that feedstock material be of relatively small particle size, reasonably homogeneous, and have a low moisture content (e.g., less than 10%).

Usually, any energy associated with the removal of excess water prior to a feedstock being input to a reactor has to be supplied to the process. Drying and combustion processes generally utilize natural gas or some other auxiliary fuel.

Thus, a need exists for improved systems and methods for converting a wet feedstock into a fuel.

SUMMARY OF THE INVENTION

The present invention provides, in a first aspect, a gasifier system which includes a reactor for receiving a wet feedstock which has a base and a container rotatably connected to the base such that a rotation of the container causes a mixing of the feedstock in an interior of the reactor. The interior is bounded by the base and the container. A space between the base and the container allows an entry of oxygen into the interior. The space has a dimension such that the feedstock is fully oxidized in a combustion area adjacent the base and such that the feedstock avoids combustion in a remainder of the interior. The reactor has a longitudinal axis inclined at an inclination angle relative to a horizontal line to promote the mixing of the feedstock in the interior.

The present invention provides, in a second aspect, a method for use in converting a wet flammable feedstock into a gaseous and liquid fuel which includes providing a wet flammable feedstock into an interior of a reactor having a base and a container connected to the base. The interior is bounded by the base and the container. Oxygen is allowed to enter a space between the base and the container to facilitate combustion of the feedstock in a combustion zone adjacent the base such that the oxygen avoids passing through the combustion zone in the feedstock to fully oxidize in the combustion zone. The container is rotated relative to the base to mix the contents of the interior of the container.

BRIEF DESCRIPTION OF THE DRAWINGS

FIG. 9 is a chart of an example feedstock mixture for use in the gasifier system of FIG. 1.

DETAILED DESCRIPTION

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

In accordance with the principles of the present invention, systems and methods for converting a wet feedstock into a fuel are provided.

In one example, a gasifier system 10 for converting a feedstock into a synthetic fuel gas (syngas 50) and liquid fuels is depicted in FIGS. 1-4. Gasifier system 10 may be an Inclined Indirect Flaming Pyrolysis Rotary Gasifier (IIF-PRG), which converts a flammable solid feedstock into synthetic fuel gas (syngas) and oil.

Figure 1:
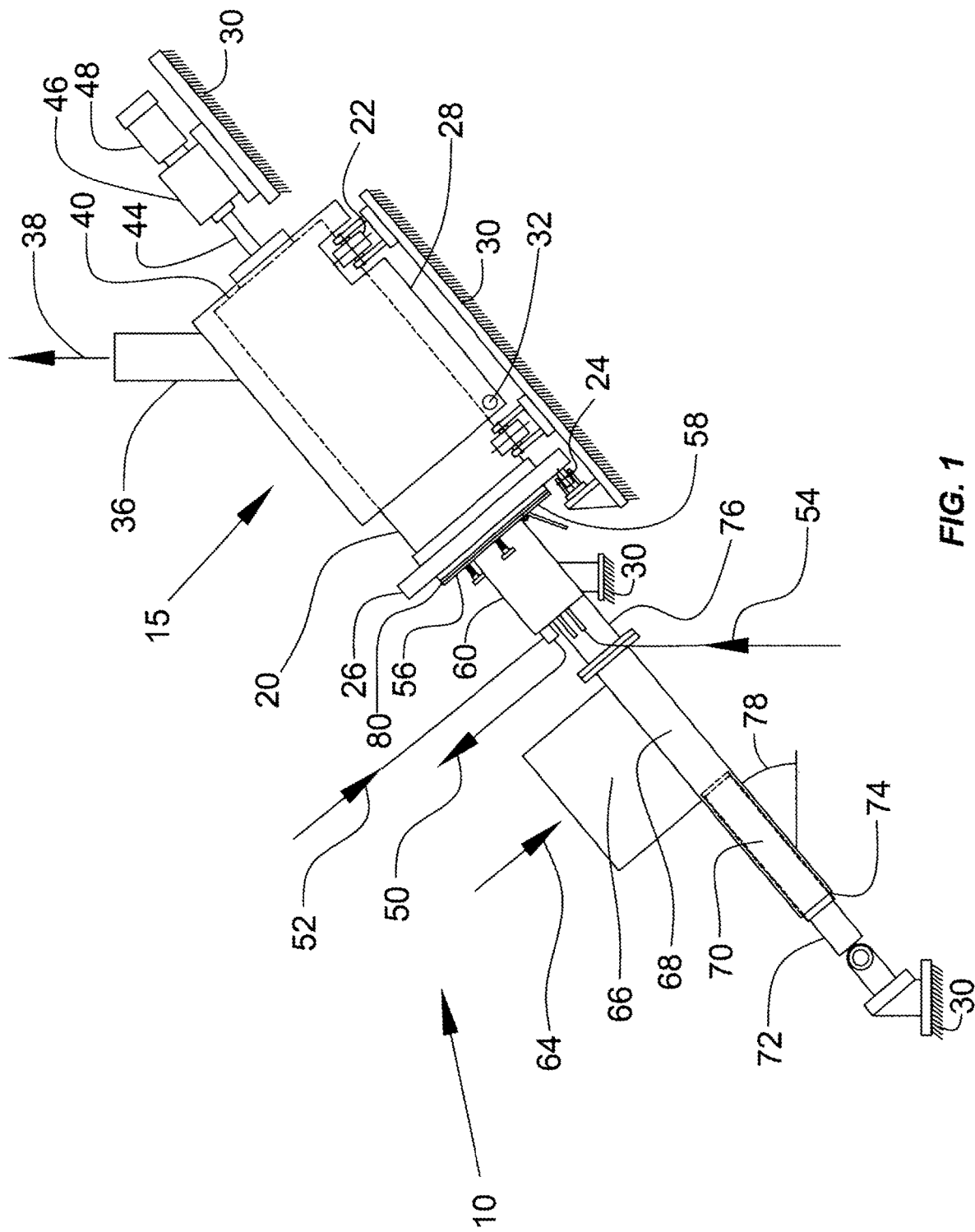
FIG. 1 is a side elevational view of a gasifier system of the present invention.
Figure 2:
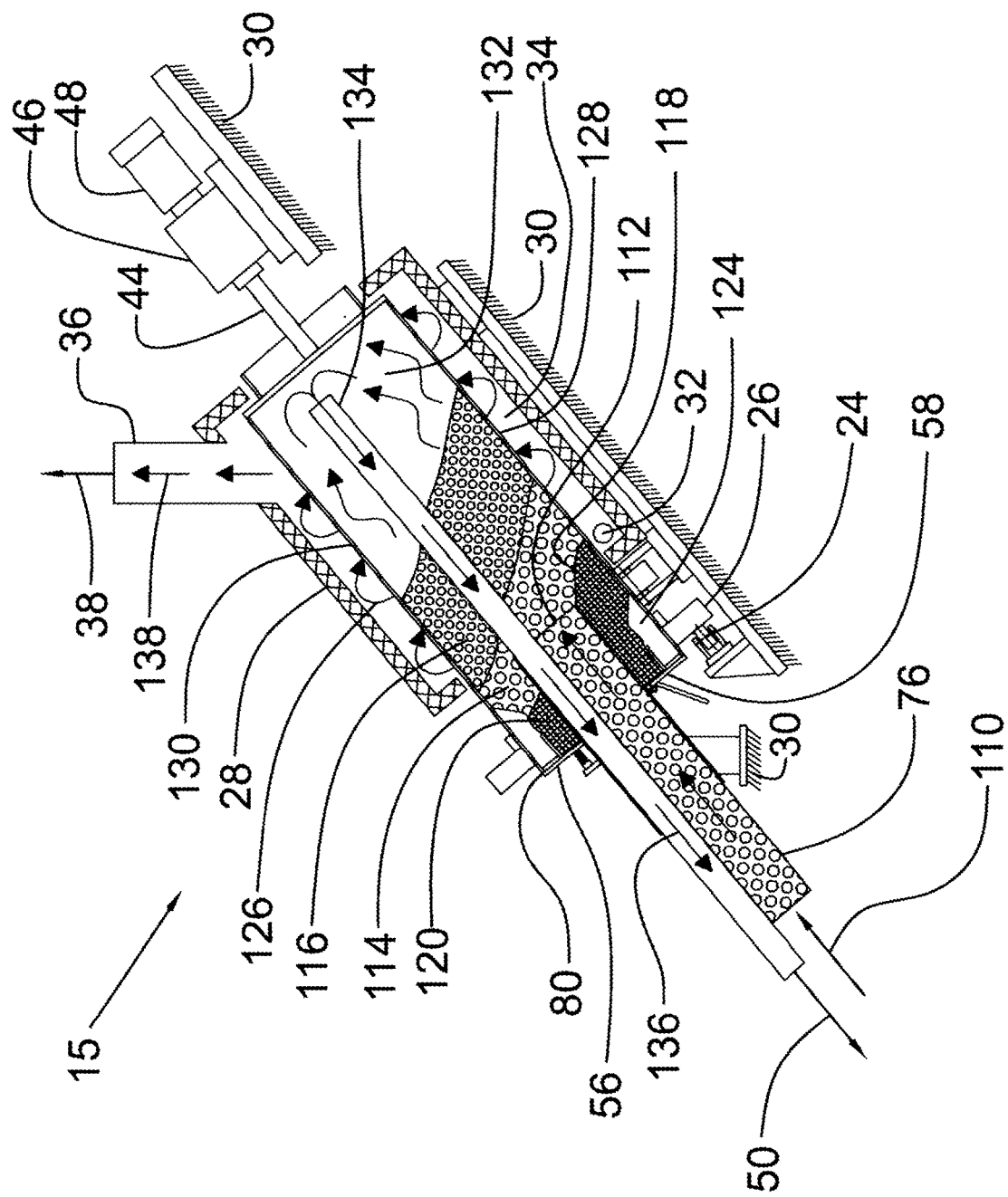
FIG. 2 is a side cross sectional view of a portion of the gasifier system of FIG. 1 loaded with feedstock.
Figure 3:
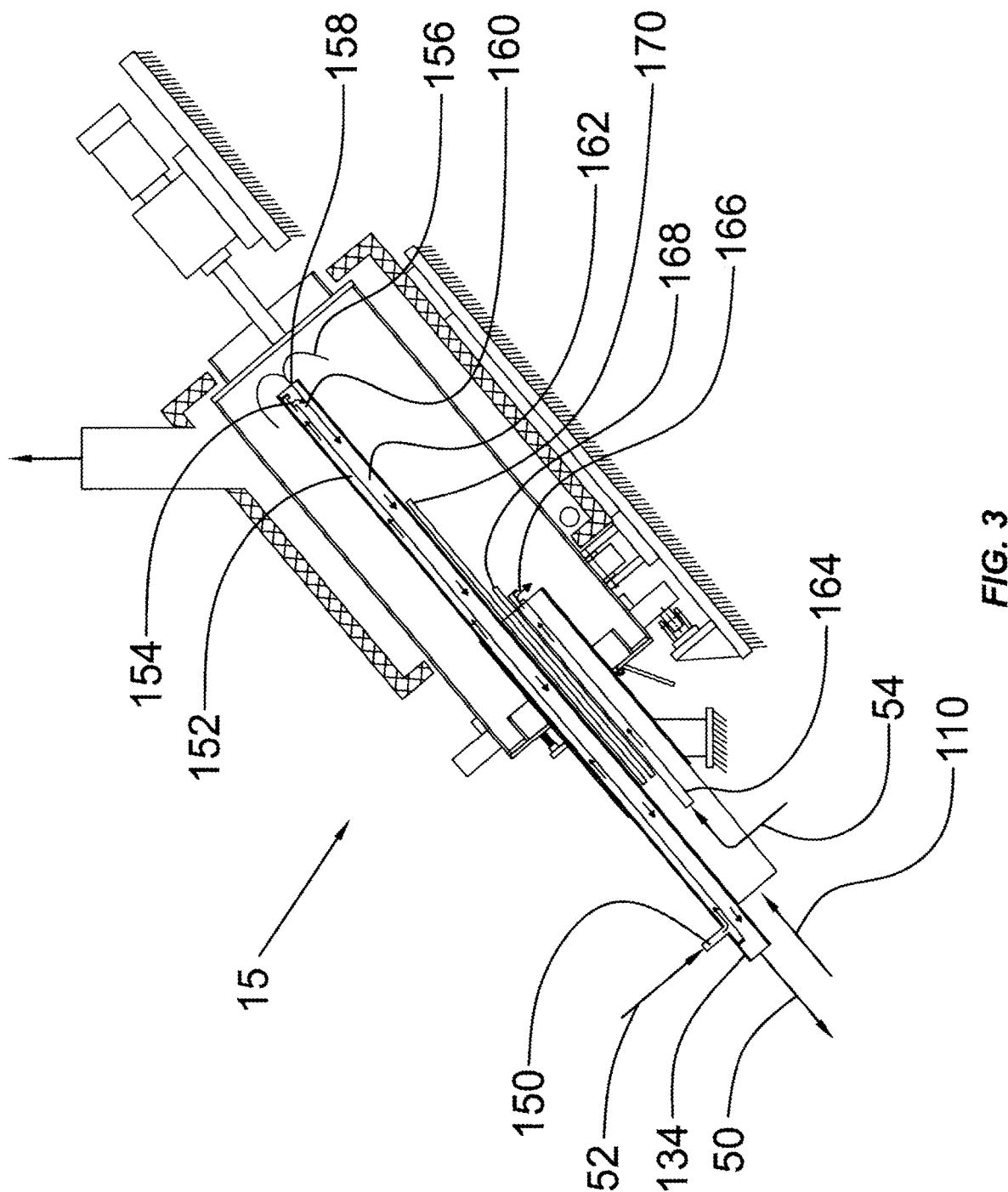
FIG. 3 is another side cross sectional view of the gasifer system of FIG. 1 empty of feedstock charge.
Figure 4:
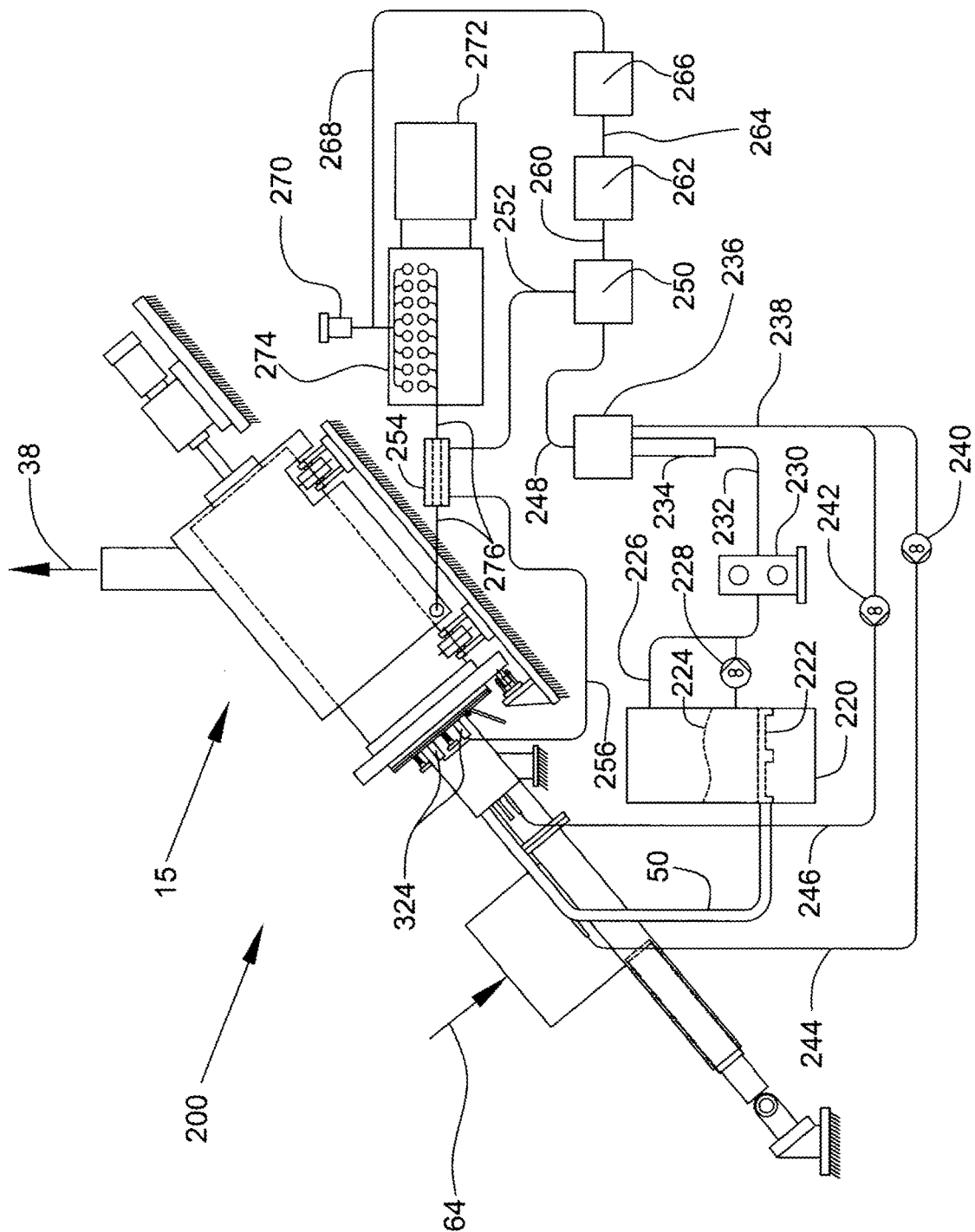
FIG. 4 is a side elevational view of the gasifer system of FIG. 1 in conjunction with a schematic showing connections to other elements of the system.

Gasifier system 10 may include a reactor 15 having a rotating drum or container 20 which is rotatable relative to a stationary base 30. Reactor 15 may be mounted on an incline 78 (e.g. greater than 22 degrees relative to a horizontal line) which allows a feedstock 116 mixed with inert items to tumble downhill (i.e., toward a lower position) toward reaction boundary 118 within a reactor 15 as depicted in FIG. 2. Container 20 may be supported by rollers 22 and rotate axially driven by a motor 48, gearbox 46, and torque tube 44, for example relative to construction of reactor. An optimum rotational speed of the reactor is between 0.2 and 0.5 rotations per minute. Reactor 15 may be supported on 4 radial support rollers 22 and at least one axial thrust roller 24 that rides against axial thrust flange 26, for example. Additional rollers could also be utilized depending on a size and shape of the container.

Base 30 may be rotatably connected to container 20 as indicated above. Container 20 may include a cylindrical wall 130 and a top 40, but could be formed of other shapes such that it is air-tight and rotatable relative to base 30. Container 20 may be continuously welded along an axial length thereof and all around top 40. Container 20 may be fully welded airtight having no openings, except at a feed end (i.e., a bottom end 172).

An ideal inclination angle 78 of reactor 15 may be 40 degrees from the horizontal, but angles greater or less than 40 degrees may be optimal based on a size and an aspect ratio. The optimum aspect ratio of the rotating cylindrical reactor vessel for an inclination of 40 degrees from the horizontal is 2.5 to provide sufficient volume to accommodate feedstock while minimizing size to limit thermal energy losses. Aspect ratios greater or less than this value are possible based on the diameter, inclination angle, and feedstock tumbling angle of repose.

Base 30 may include a feedstock input conduit 76 and an oil input conduit 164. Feedstock 64 may be received in feed bin 66 and may be municipal solid waste, for example. Feed bin 66 empties into compression chamber 68. Also the feedstock could be any flammable solid feedstock that burns with an open flame including, but not limited to wood, energy crops, coal, construction and demolition wastes, agricultural wastes, sewage sludge, waste lubricants, and municipal solid wastes. A unique inclined rotational property of gasifier system 10 allows inert non-flammable items to be mixed with the feedstock, avoiding the need to prepare and separate inerts items from feedstock prior to processing. Inert items such as metals, glass, stone products, and soils simply pass thru the system and are discharged out of the gasifier through door 58 as an ash, which results from the process. Ash door 58 opens and is a bottom segment of swash plate 56. Ash door 58 is mounted on hinges 322 and can swing open using handle 320.

As indicated, a feedstock 110 and an oil (e.g., a reflux oil) 54 are fed into the reactor. Syngas 50 exits the reactor through a syngas exit conduit 134 located on a lower end of reactor 15 and which may be mounted above the axis of rotation of container 20. Stationary syngas exit pipe 134 extends a full axial length of the cylindrical rotating reactor vessel, i.e., reactor 15. Syngas 132 enters the syngas exit pipe 134 at a full uphill location 158, alleviating the possibility of feedstock entering the pipe and causing blockages. Wash oil 52 is supplied through a conduit 152 and exits through a notch 154. Syngas 156 mixes with wash oil 52 at mixing point 160. Syngas 156 immediately cools and a syngas oil mixture 162 flows downhill and exits the reactor through stationary base 60.

The gasifier may process solid feedstock without a need for pre-drying. Feedstock falls into a compression chamber 68. The feedstock handling system uses a hydraulically powered piston 72 to drive ram 70 to both compact and push feedstock into reactor 15. Feedstock is exposed to excessively high compaction forces, which mechanically removes excess water by squeezing, which drains at point 74. The piston may cause the feedstock 110 to be fed through feedstock input conduit 76 of base 60 through an exit 112 into an interior 114 of container 20.

Feedstock processed may be dripping wet mixed wastes with moisture contents exceeding 80% (i.e., wet basis, 80% water and 20% solids). The feedstock may be mechanically dewatered to a moisture content of less than 50% (wet basis) by squeezing feedstock to compressive stresses of up to 2800 pounds per square inch using piston 70. Water may freely drain by gravity from the feedstock during the compression stroke due to wide clearances between piston 70 and compression chamber 68 and a steep inclination angle 78. Water may be collected in a holding tank (not shown). The feedstock may be compressed and densified during such dewatering to remove air voids, preventing gases from flowing in conduit 76 and also increasing a mass holding capacity of the reactor vessel 20. In an example, a geometry of compression chamber 68 may transition from square (or rectangular) to round at the connection point with feedstock conduit 76, thereby providing a length of controlled frictional force between the feedstock and the feed tube wall. This natural resistance may provide sufficient force to allow the piston or ram to fully compress the feedstock to the compressive forces necessary for dewatering and densification.

Reflux oil 54 may be pumped from a quencher 220 through oil input conduit 164 and through oil exit 166 into interior 114. Oil 54 is thermochemically converted into syngas at reaction boundary 118. The reactor 15 creates oil aerosols, which condense in quencher 200 as fluid 224 (e.g., reflux oil). Additional oil may also be received into quencher 220 from other sources and could, for example, be mineral oil, vegetable oil, animal fats and oils, used cooking oil, used crankcase oil or other lubricants, or various mixtures of these components.

Figure 5:
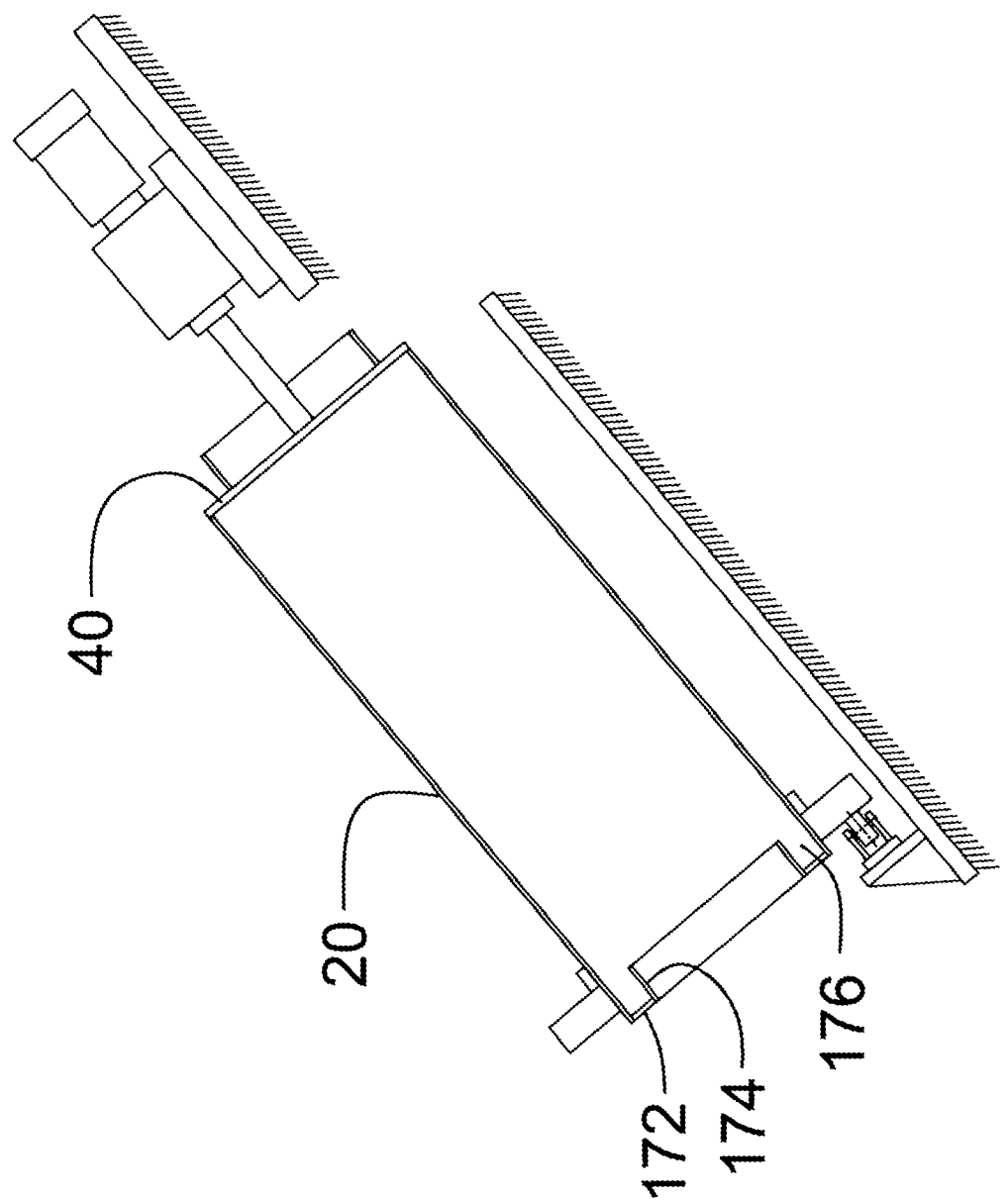
FIG. 5 is a cross sectional view of a portion of the gasifier system of FIG. 1 showing a bottom of reactor thereof.

Base 30 may include a stationary nozzle 60 and a self-locating spring loaded swash plate 56. The swash plate may contact or be engaged to bottom end ring 172 (FIG. 5) of container 20 such that a space 80 is present between plate 56 and bottom end 172.

As indicated, the feedstock may be partially densified when entering the reactor due to an activation of piston 70 or anther compaction/dewatering mechanism. Such compressed feedstock may act as a material seal to prevent the entrance of air into the rotary gasifier at the feed point 112. In particular, partially reacted feedstock, in the form of fixed carbon, may accumulate in the annulus 120 between the stationary nozzle 60 (i.e., base 30) and a rotating cylindrical reactor sleeve 174 (i.e., reactor 15). Combustion air, may enter through space 80 described above may flow through the fixed carbon annulus 120, providing intense red hot burning coals within annulus 120. Oxygen is consumed within annulus 120, providing intensely hot combustion gases that may consist primarily of carbon dioxide and nitrogen when reaching hot to cold interface boundary 118. The burning red hot layer of coals within annulus 120 acts as a rotary seal between the rotating cylindrical reactor sleeve 174 and the stationary nozzle 60. No mechanical seals between rotating and stationary elements are required or used.

Reactor 15 may be aspirated using enriched air or pure oxygen as a means to enrich the energy content of the syngas by minimizing nitrogen content. Enriched air or pure oxygen is fed into the cylindrical rotating reactor vessel using multiple gas injection tuyeres 324 that are mounted directly to the stationary self-locating spring loaded swash plate 56 on the far downhill end of container 20, e.g., at space 80 describe above. Oxygen is fed until the pressure at the swash plate is slightly positive (about +0.5 iwg positive pressure).

As depicted, swash plate 56 may be located on a lower end of container 20 and may hold burning red hot fixed carbon within container 20 and evenly distribute a flow of aspiration (combustion) air from space 80 into the lower or downhill end of the rotating cylindrical reactor vessel (i.e., reactor 15). As the fixed carbon burns to ash, the ash and clinkers may grind to fine powder between the stationary swash plate 56 and rotating riding ring 172. Ash discharges to atmosphere through the air intake clearances (i.e., space 80) and falls into a centrally located collection pan located below (not shown). Further, swash plate 56 may include an ash dump door 58 at the far downhill location to facilitate the removal of large inert items such as stones, metals, glass, etc., that may accumulate within the reactor. The door may also serves as a means to fully dump remaining feedstock from the reactor interior when desired.

The feedstock is thermo-chemically reacted at boundary 118 to fixed carbon. This carbon burns, as red hot coals, to carbon dioxide, using air, enriched air, or pure oxygen at the far downhill end or lower end of reactor 15. Combustion products consisting primarily of carbon dioxide and nitrogen mix with and dilute the syngas 132, lowering the energy content (heating value). The rotating action of the reactor vessel consistently tumbles a bed of the red hot coals within the gasifier vessel, allowing full and complete reactions, while alleviating air gaps and blockages which could inhibit such reactions. The tumbling action and inclination angle 78 allows the feedstock with excessive fine particle size and plastic content to be processed without blockages. Fixed carbon is fully burned to ash and discharges with inert items (soil, stones, metals, glass, etc.) at the far downhill end of the gasifier through clearances (e.g., space 80) between swash plate 56 and riding ring 172, for example, or ash dump door 58.

The feedstock level within reactor 15 is monitored using internal temperatures. Temperature sensors 168 and 170 measure the internal temperature various axial distances that are mounted in thermo wells at the end of the stationary concentric nozzle 60 (i.e., base 30). These temperatures are used to monitor the level and temperature of the feedstock charge within the reactor vessel and a cool temperature may indicate the presence of raw wet feedstock at the measuring point. A hot temperature indicates the lack of feedstock at the measuring point.

Feedstock input conduit 76 may be stationary relative to container 20 as described above, with nozzle 60 being concentric and extending into container 20 to introduce wet feedstock (e.g., at about 50% moisture content or 50 lbs of water for every 100 lbs of wet feedstock) directly into the an Updraft Direct Flaming Line Flash Gasification (UDFLFG) reaction boundary 118. UDFLFG uses dramatic temperature gradients to flash dry and then flash devolatilize solid and liquid feedstock into synthetic gas, oil aerosols, and fixed carbon. Air, enriched air, or pure oxygen is used to combust the remaining fixed carbon to create the heat required to sustain the process. Gasification occurs on a very narrow boundary line 118 where the temperature differences can exceed 2000 deg. F over a very short distance, typically 1 to 6 inches in length. Wet feedstock 110 that was fed through conduit 76 and enters reactor 20 at exit point 112, tumbles and forms a wet layer 114. Partially dried feedstock is pushed uphill and forms a dry layer 116. Feedstock in dry layer 116 continually mixes with fresh layer 114 as reactor shell 20 rotates. Feedstock is converted to gas and fixed carbon char at the point of devolatilization at the UDFLFG boundary 118. Feedstock is continually consumed, diminishing layers 114 and 116, allowing temperature sensor 170 to be exposed, resulting in a significant temperature increase. To sustain the process, additional fresh feedstock 110 must be fed into wet layer 114 until sensor 170 is fully covered as indicated by a significant drop in temperature.

Feedstock input conduit 76 may be shaped (not shown) at exit 112 to open a bottom half of the feed pipe at a discharge point to force cold wet feedstock directly into the UDFLFG reaction boundary 118. The ideal feed point aspect ratio is 0.5, but this value may vary based on the reactor diameter and inclination angle.

As described above, air or components thereof (e.g., Oxygen) enters the bottom of a hot burning char annulus 120 below UDFLFG reaction boundary 118 via the space 80, causing fixed carbon to burn at temperatures between 2000 and 2200 deg. F within annulus 120.

The flow of oxygen into the reactor 15 may be self-regulating. The aspiration of syngas flow 50 is kept constant, so if the temperature drops, a rate of feedstock gasification (gas production from devolatilizing the feedstock) drops, forcing more oxygen (air) to enter the fixed carbon combustion zone annulus 120, quickly increasing the temperature, which in turn increases the rate of gas production from devolatilizing the feedstock. Vice versa occurs when the temperature becomes too hot (more gas from feedstock and less oxygen enters the combustion zone).

Condensate water 252 from gas drying may be thermchemically processed within reactor 15 in a controlled manner by chemically splitting water into flammable hydrogen and carbon monoxide gases using the water gas and water shift reactions. Condensate 252 enters superheater 254, where liquid water 252 is converted into superheated steam 256 using hot exhaust gases 276. Condensate water vaporizes to superheated steam 256 using excess exhaust heat. Superheated steam 256 is injected through swash plate 56 directly into the burning red hot fixed carbon bed annulus 120 using multiple injection tuyeres 324. The degree of steam conversion to flammable gas is regulated based on the temperature within the burning fixed carbon bed. Additional amounts of waste water can be processed at times of excess thermal energy. Superheated steam 256 may be mixed with air, enriched air, or oxygen to form mixture 330, which is supplied to distribution manifold 326. A supply conduit 328 supplies mixture 330 to the injection tuyeres 324, which may have a distribution notch 352, which is pointed in the direction of rotation of a bed flow 354 to prevent the entrance of red hot coals and ash from annulus 120 from entering and blocking the tuyeres.

Cold wet feedstock 110 and oil 54 (e.g., pyrolysis oil or reflux oil 224 from quencher 220) are fed into reactor 15 separately as described above, but are fed directly into the UDFLFG boundary 118, pushing warmer and dryer feedstock uphill or further away from bottom end swash plate 56. Intense heat and combustion gases directly contact the cold wet feedstock and oil mixture, causing flash drying and flash de-volatilization into flammable syngas directly on boundary 118. Heat transfers over the boundary 118 by direct conduction, radiation, and forced convection. The thermochemical reactions may occur directly on the boundary 118 between the intense heat from burning red hot coals in annulus 120 and cold wet feedstock 114. The temperature of the feedstock in layer 114 can increase from 150 to 2200 degree F. when passing over boundary 118 and entering into annulus 120. These temperature gradients may occur over one inch of linear distance at boundary 118 within the materials in the container. The burning red hot coals within annulus 120 may be maintained at a temperature of approximately 2200 degrees F. and may be the sole combustion zone of the feedstock fed into container 20. Temperatures in the reactor reduce rapidly from the 2200 degrees F. in the combustion annulus 120 to approximately 500 degrees F. when passing through wet feedstock layers 114 and 116 upon exit from the reactor at syngas flow 158.

A layer of cold wet feedstock 114 starts to dry and mixes with a warm dry feedstock 116 above as a fresh flow of feedstock 110 into the gasifier stops. In this case, the wet feedstock dries and the two layers 114 and 116 to merge into one, causing the overall temperature within the reactor to rise due to the drop in thermal load from drying. This excess feedstock accumulates uphill of (i.e., above) the UDFLFG reaction boundary 118 when the gasifier is full of feedstock. The temperature of this unreacted or partially reacted feedstock gradually increases as it dries. The normal temperature of the feedstock within this zone is approximately 250 to 400 deg. F, depending upon the operating conditions within the reactor.

Tar aerosols may form during flash gasification at UDFLFG reaction boundary 118. Excess feedstock is desired uphill (i.e., above) the UDFLFG reaction boundary 118, to act as an internal filter to capture high molecular weight tars as the gas filtrates through the drying tumbling bed. Syngas, tar aerosols, organic vapors, water vapor, and steam form mixture 132 and pass through this layer of excess warm wet drying feedstock 116 which is pushed uphill as excessive cold wet feedstock 114 enters the reactor at 112. Heavy tar aerosols partially condense within both layers 114 and 116 of warm wet drying feedstock. These tars agglomerate onto the feedstock and are thermochemically cracked into lighter molecular weight fractions when reaching the UDFLFG reaction boundary 118. These oils vaporize or form aerosols as the feedstock enters the flash gasification boundary 118, thereby producing a pyrolysis oil (e.g., biocrude) that is condensed into a liquid in quencher 220. Oil production can be in excess of 30% of the gross feedstock energy, depending on the plastics content of the feedstock.

Organic aerosols and vapors mixed with syngas and steam mix to form flow 132, that exits reactor 15 using conduit 134 and condense to a liquid (i.e., oil) within quencher 220 by a sudden drop of temperature when passing through dispersion nozzle 222. Steam condenses to liquid water, which evaporates back into the gas in the form of vapor, absorbing thermal energy to cause quencher oil 224 to equalize between 165 and 175 deg. F. Wet feedstock is required to produce sufficient moisture to sustain this evaporative cooling effect. Water must be added directly (not shown) into quencher vessel 220 when processing dry feedstock. Quencher oil 224, consisting of condensed oil from reactor 15 is used as the primary liquid to clean the gas using impingement scrubber 234. Syngas exits quencher 220 through a conduit 226 and enters a gas mover 230, which may be a positive displacement rotary lobe blower. A metering pump 228 feeds quencher oil directly into conduit 226, flooding a suction side of gas mover 230 with oil mixed with syngas. The pressurized mixture exits through conduit 232 and enters an impingement scrubber 234. A nozzle at the inlet of scrubber 234 accelerates the mixture of gas and oil to excessively high velocities. This mixture of high velocity fluids impinges directly on a static bed of oil at the nozzle exit. A high momentum exchange forces tars and particulates from the syngas into the oil. An oil separator 236 removes liquid oil from the syngas prior to entry into a syngas conduit 248. Liquid oil drains through a conduit 238. This flow is split into a reflux metering pump 242 and wash pump 240. Metering pump 242 feeds reflux oil back into reactor 15 through a conduit 246 and oil input conduit 164. Wash oil pump 240 feeds wash oil 52 to reactor 15 through a conduit 244 and conduit 152. Reflux oil 54 continually circulates back into reactor 15 through conduit 246 and oil input conduit 164, and is thermochemically cracked into low molecular weight hydrocarbons that readily evaporate into the syngas and exit the process as a vapor, greatly increasing the energy value of the syngas. The particulates in the oil from impingement scrubber 234 eventually discharge from reactor 15 with the ash.

For example, hot syngas from reactor 15 drops in temperature when entering the quencher 220. Oil aerosols, vapors, and steam mixed with the synthetic gas immediately condense to a liquid when passing through a distribution nozzle 222. The moisture and organic vapors re-evaporate into the syngas as a vapor when exiting the quencher. The amount of energy required to re-evaporate these liquids is higher than the thermal energy entering the quencher, eliminating a need for cooling the oil (heat exchanger or cooler) present in other systems and processes. The condensed oil is continually thermochemically processed within the combustion zone into higher vapor pressure lower molecular weight organics as described above. These organics evaporate into the gas and leave the quencher in the form of vapor.

Excess oil is continually fed back into the reactor for reprocessing as reflux. For example, reflux oil 54 from quencher 220 is fed directly into the reactor at the point 166 (i.e., oil input conduit 164) where raw feedstock is introduced 112, directly above the reaction boundary 118. Heavy molecular weight organics are thermochemically cracked into lighter molecular weight organics by intense heat. Catalyst is not required. Thermal cracking of high molecular weight oils and tars into low molecular weight organics naturally continues until the molecular weight and vapor pressure are within the range of less than C8 organics to allow the liquid fuels to exit the process as a vapor that evaporates directly into the syngas in the form of organic humidity. The flow of reflux oil 54 adjusts to insure the oil creation rate matches the thermochemical conversion rate, insuring all created heavy organics leave the process as organic humidity, which evaporates into exiting syngas flow 50.

All feedstock moisture is flashed to steam, which exits the gasifier (i.e., reactor 15) in the superheated state mixed with syngas 132 through syngas exit conduit 134. Steam condenses to a liquid and then evaporates back into the gas as a vapor within quencher 220. Syngas saturated with moisture passes through a gas mover 230 and impingement scrubber 234. This moisture may be condensed back to liquid water in a condenser 250 portion of a gas cleaning system. The condensate water returns to reactor 15 to be thermochemically reacted into flammable hydrogen and carbon monoxide gases as described above.

The gas may be cleaned in multiple steps as shown by a gas polisher 262, then heated significantly above the pressure dew point using a reheater 266, then delivered through a conduit 268 and mixed with combustion air from an intake filter 270, before being consumed as fuel within a combustion based device (e.g., a diesel engine 274 driving generator 272). The gas may be used to substitute for up to 80% of the liquid diesel fuel required in the configuration shown on FIG. 4, for example, in diesel combustion gensets or diesel-based electrical power generators. Syngas handles and burns similar to natural gas, which can be used to fuel a variety of devices.

Reactor 15 may be surrounded by an insulated stationary shell 28. A cavity 34 forming an annulus for receiving heated gases may be bounded by an external surface 130 of reactor shell 20 and internal surface of stationary shell 28. The gases may flow through an tangential input 32 of shell 28.

Heat 126 may be indirectly transferred at surfaces 130 and 128 through the cylindrical rotating reactor shell 20 to provide additional thermal energy to assist with feedstock drying and to increase the temperature of the exiting syngas and superheated steam to about 450 to 700 deg. F, depending on the level and moisture content feedstock layers 114 and 116 within the gasifier.

Indirect thermal energy is provided from waste heat sources (e.g. to cavity 34 and reactor 15) such as diesel exhaust, which commonly discharges to the atmosphere at 900 to 1200 deg. F when a diesel generator is operating at load. Hot exhaust gases at 900 to 1200 deg. F may thus blow against the gasifier shell and flow cyclonically 126 within cavity 34 to provide optimum heat transfer. Alternatively, heat energy may also be extracted from a radiator coupled to a combustion device with such energy being provided to cavity 34 via air heated by such a radiator.

Heat transfer pins and fins may be welded onto and thru the wall 20 at surfaces 128 and 130 to increase the heat transfer area, to improve indirect transfer of thermal energy from the external heat source (e.g., diesel exhaust) to interior feedstock flows 114 and 116, and syngas 132. Significant indirect heat transfer occurs through the wall of the reactor shell, heating feedstock and the mixture of syngas, superheated steam, organic vapors and aerosols. The mixture exits the reactor at the uphill end 158 at temperatures between 350 and 700 deg. F.

The heat provided to reactor 15 via cavity 34 and external surface 128 and 130 of reactor 15 may maintain a temperature of interior 132 and may bring interior 132 to a desired temperature at a beginning of a process such that a start up time of the process may be minimized. The provision of heat to cavity 34 as described may maintain, contribute to, augment or otherwise control a temperature of interior 132.

Cool exhaust gases from cavity 34 exhaust to atmosphere through conduit 36 as flow 138. The only emissions point to the atmosphere from the entire process is exhaust gas flow 38.

Figure 6:
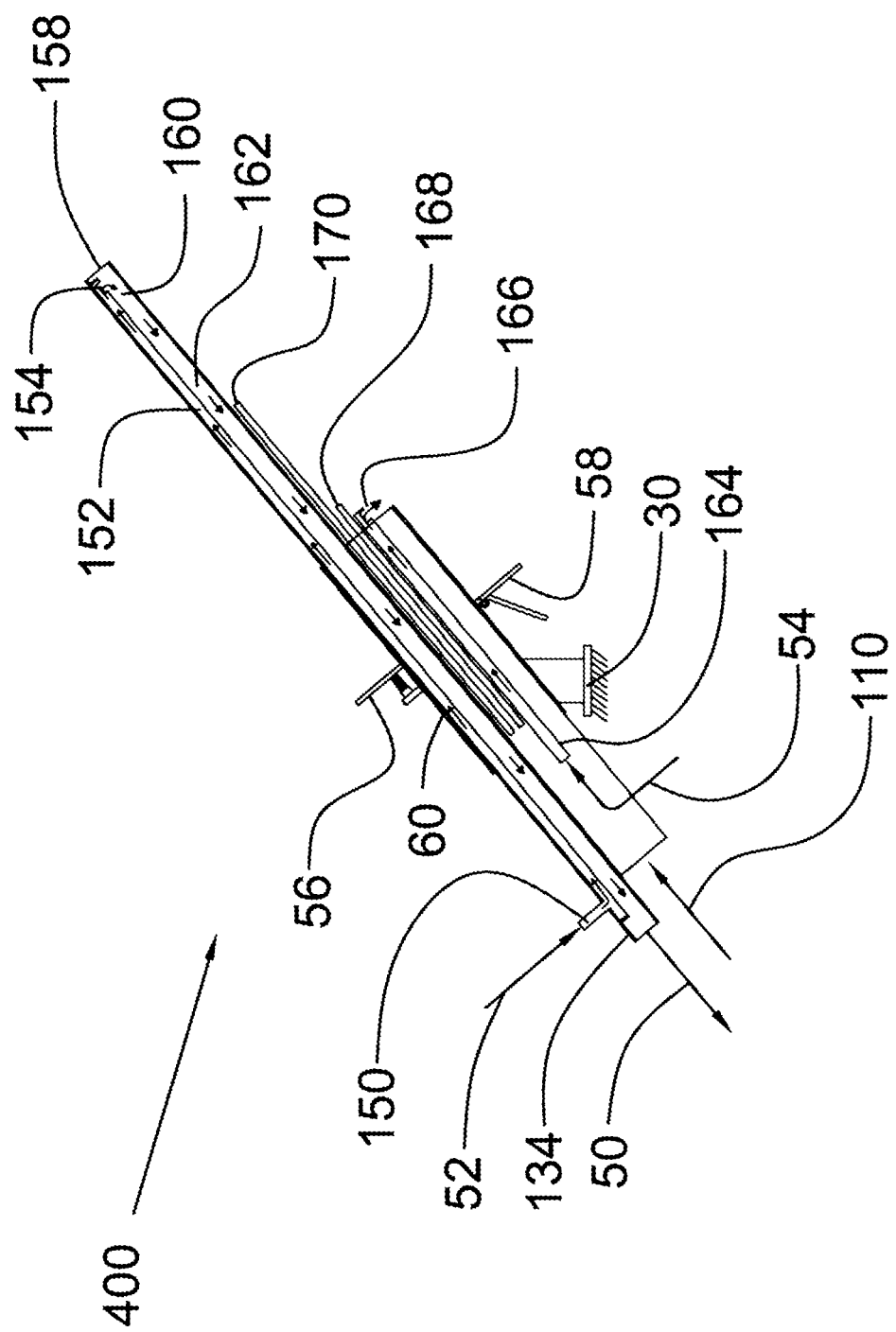
FIG. 6 is a side cross sectional view of the nozzle assembly of the reactor of the gasifier system of FIG. 1.
Figure 7:
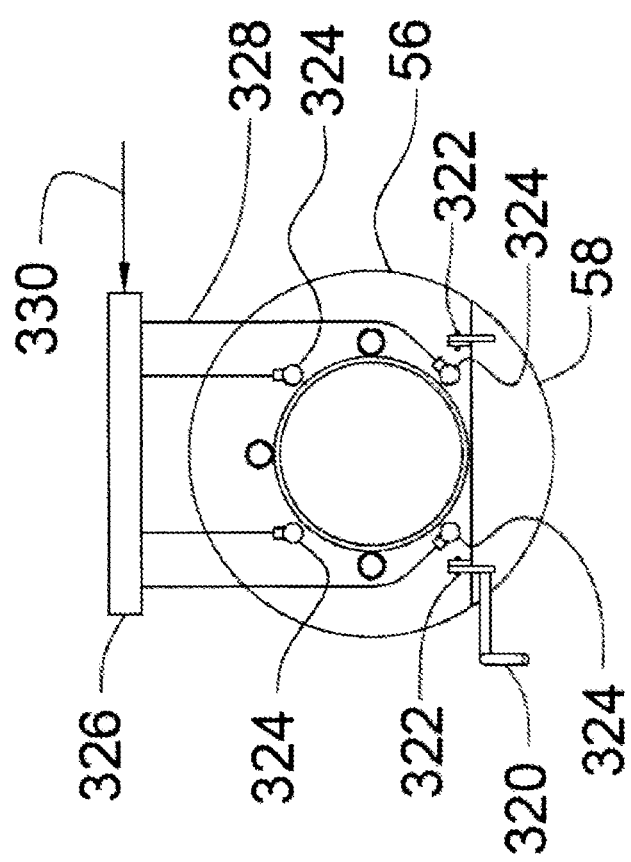
FIG. 7 is a bottom view of the reactor showing the spring plate detail of the gasifier system of FIG. 1.
Figure 8:
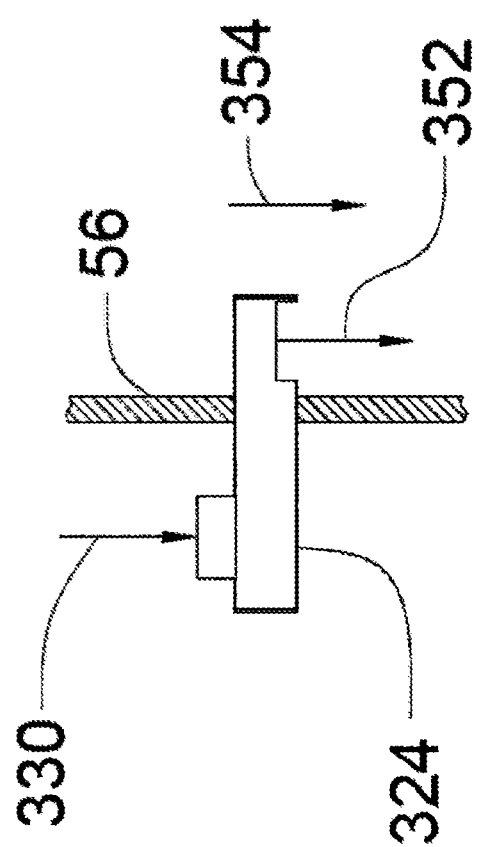
FIG. 8 is a side view of a portion of the gasifier system of FIG. 7.

Stationary nozzle assembly 400 consists of all of the components shown on FIG. 6 as described above. Furthermore, a rotating cylindrical reactor sleeve 174 forms annulus 176, between outer shell 20 and sleeve 174. Partially reacted cool feedstock 124 accumulates within annulus 176 to shield the reactor shell 20 from excessive temperatures that could melt the shell. The accumulation of partially reacted feedstock 124 in annulus 176 prevents the need for refractory to protect the internal surfaces of shell 20 and conducts heat away from sleeve 174.

An example of a process for gasifying waste is depicted in FIGS. 1-4. Raw feedstock 64 enters feed bin 66 and a compressor (e.g., a piston 70) compresses the feedstock at within compression chamber 68. Excess moisture drains from the compressed feedstock at point 74. The moisture content of the feedstock at flow 110 is less than 50% (wet basis).

Wet feedstock thermo-chemically reacts within reactor 15. Oil (e.g., excess reflux oil) may enter reactor 15 at boundary 118 though a conduit pipe 164 separate from feedstock conduit 76 as described above. Heavy molecular weight oil thermo-chemically cracks into lighter organic vapors when contacting the intensively hot burning char layer at boundary 118. Ash exits the process at swash plate 56 and ash dump door 58. All feedstock moisture exits the gasifier in the form of superheated steam, mixed with syngas 132 and wash oil 52, exits the gasifier (i.e., reactor 15) as mixture 136, and enters a quencher 220 to reduce the temperature from more than 700 deg. F down to about 175 deg. F, by bubbling the gas through a liquid filled column 224 at dispersion nozzle 222. Quencher liquid 224 in quencher 220 is primarily pyrolysis oil created by the process described herein, but may contain condensate water, mineral oil, vegetable oil, animal fats and oils, used cooking oil, used crankcase oil or other lubricants, or various mixtures of these components that may be intentionally added directly to the quencher for disposal in the process. Another purpose of the quencher is to prevent explosions in downstream equipment by using liquid 224 to extinguish any flaming embers that may exit the gasifier with the syngas. Superheated steam flash condenses to water and then re-evaporates in the form of humidity, which saturates the syngas within exit conduit 226. Evaporation causes a significant refrigeration effect that provides sufficient thermal energy to cool the syngas and condense the superheated steam within quencher 220. Recovered condensate water from condenser 250 may be added directly to the quencher vessel if the feedstock is dry (less than 20% moisture on a wet basis), providing sufficient moisture to sustain evaporative cooling.

Saturated syngas exits the quencher through conduit 226 at slightly negative pressure and mixes with oil 224 from quencher 220 using metering pump 228 prior to entering positive displacement blower 230. The blower serves as the primary means to aspirate the system. A slight amount of quencher liquid may be injected using metering pump 228 to lubricate the blower and provide fresh scrubbing liquid to impingement scrubber 234. Slightly pressurized syngas exits the blower through conduit 232.

Syngas is first cleaned in impingement scrubber 234, where high momentum exchange between the gas and liquid removes the high temperature dew point tars and particulates. The impingement scrubber internally recirculates the oil multiple times prior to draining. The top portion of the scrubber contains a liquid separator 236. Hot liquids drain from the scrubber through conduit 238 and are returned to reactor 15 using pumps 242 and 240. Reflux meeting pump 242 regulates the flow of reflux oil through conduit 246 and varies the flow to insure the oil level 224 in quencher 220 remains constant during operation. Wash oil pump 240 delivers the remaining oil as wash oil 52 through conduit 244 and conduit 152.

Figure 11:
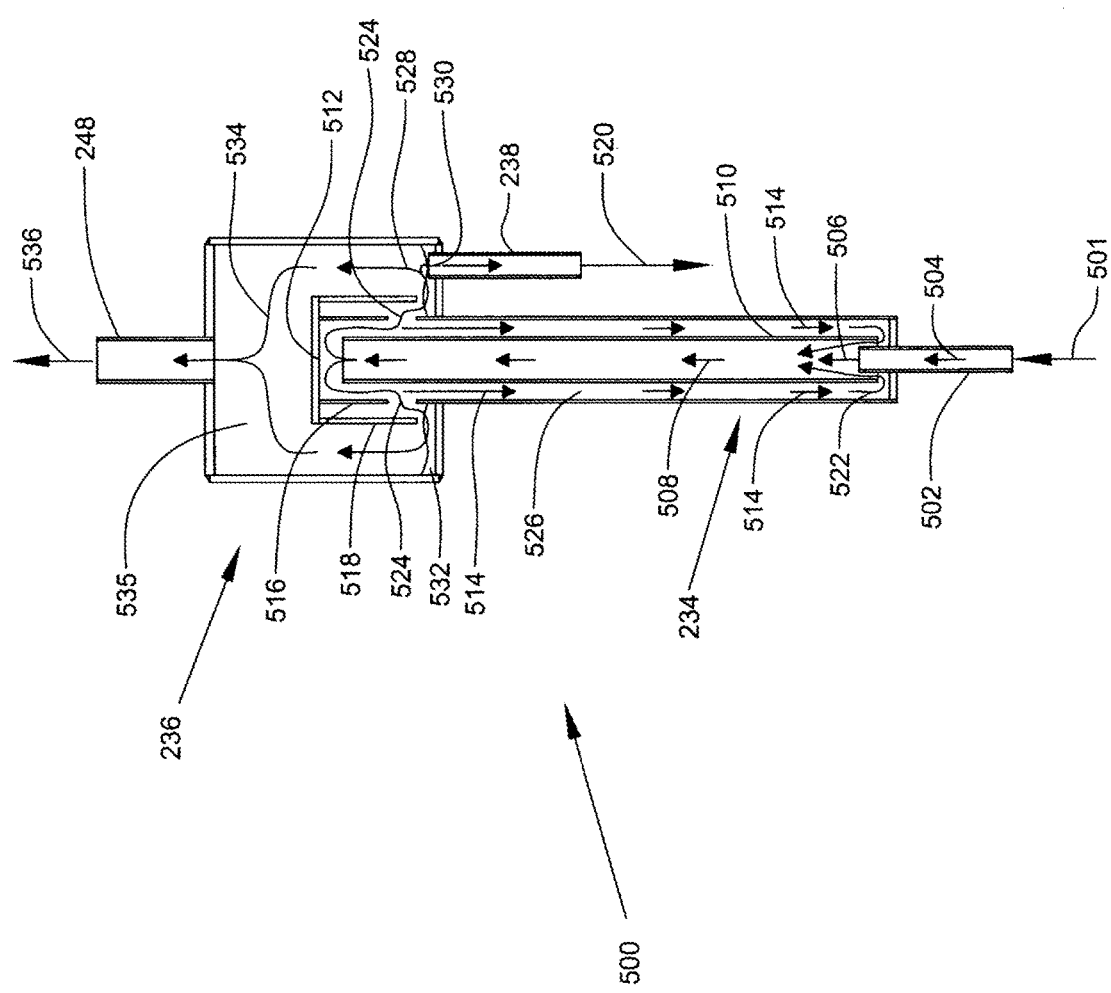
FIG. 11 is a cross sectional view of an impingement scrubber and integral oil separator for use with the gasifier system of FIG. 1 in accordance with the present invention.

Impingement scrubber 234 and integral oil separator 236 are shown in FIG. 11 as a cross sectional view 500. Impingement scrubber 234 works on a principal of high momentum exchange between fluids to remove high dew point tar aerosols (e.g., over 155 deg. F) and particulate matter from the syngas stream. A mixture 501 of syngas and oil from conduit 232 in a ratio of 30:1 by volume is supplied to a nozzle 502. Mixture 501 accelerates to a velocity at point 504 approaching half the speed of sound (30,000 ft/min), although velocities up to the speed of sound are possible at the cost of additional pressure drop. A nozzle 50 extends into a lift pipe 510, creating a relative suction at a point 522. An oil 514 flows downward in annulus 526 by gravity and by suction at point 522. Oil at static velocity enters lift pipe 510 at point 522, where a high velocity mixture 504 of syngas and oil impinges at high momentum exchange at a point 506 to form a mixture 508, which travels up the lift pipe and hits an impingement plate 512. A primary baffle 516 directs a majority of oil from mixture 508 to flow down an annulus 526. Syngas and excess oil from mixture 501 exits thru ports 524. Oil from mixture 501 is directed downward by a secondary baffle 518, allowing oil aerosols and droplets to disengage from the exiting scrubbed syngas 528. An exiting syngas 528 flows into greater flow area 535, resulting in a further drop of an exiting syngas flow velocity 534, allowing the remaining oil droplets to disengage and fall into oil pool 532. Oil discharge conduit 238 extends into the separator vessel at a point 530 to regulate a level of an oil reservoir 532. An excess oil 520 drains from oil separator 236 through conduit 238. Syngas with oil droplets 538 enter a low velocity area 535, where additional oil droplets disengage and flow into reservoir 532. An oil free syngas 536 exits through conduit 248.

Saturated syngas exits oil separator 236 and enters condenser 250 using conduit 248, where the gas is cooled to within 20 degrees of ambient temperature. Liquid condensate and syngas exit the cooler and enters a condensate separator (not shown). Liquids drain from the separator and enter conduit 252, which delivers the liquid water to superheater 254. Thermal energy from exhaust 276 converts the condensate from liquid to superheated steam that enters conduit 256 and enters into reactor 15 using injection tuyeres 324 (mounted in swash plate 56). Steam is thermochemically converted to flammable hydrogen and carbon monoxide gases using the water gas reaction. Liquid condensate is cracked into additional syngas (i.e., syngas 50) within reactor 15. A flow of condensate from the condenser 250 to reactor 15 is regulated by a valve based on the temperature of the burning fixed carbon bed in annulus 120 in the reactor.

Syngas with moisture content of less than 3.5% exits the condenser 250 and enters gas polisher 262 using conduit 260. The polisher mechanically slings a glycol based polishing liquid into the syngas stream using a high momentum exchange to remove any remaining particulates and low dew point tars. The mixture enters a glycol separator (not shown) where the liquids are captured and recirculated back to the polisher.

Figure 12:
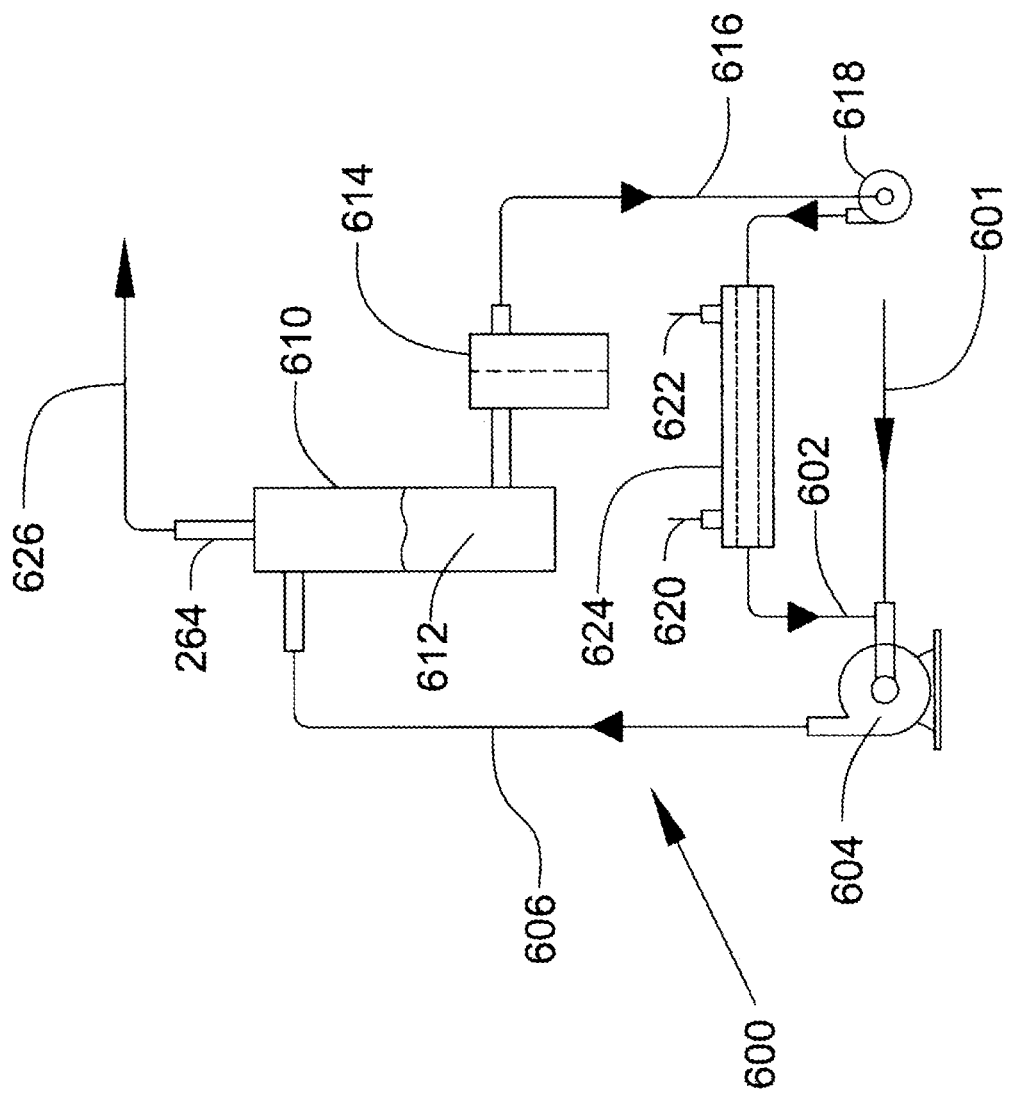
FIG. 12 is a block diagram view of a polisher for use in the gasifier system of FIG. 1 in accordance with the present invention.

FIG. 12 depicts polisher 262 shown as system 600, which removes low dew point organic tar aerosols and remaining particulates. A polishing liquid 612 may be ethylene glycol, propylene glycol, or any low vapor pressure solvent, for example. Polishing liquid 612 discharges from a cyclonic separator 610 and passes through a strainer 614 to remove large particulates. A cool polisher liquid 616 enters a booster pump 618 to insure a constant flow of liquid. A heat exchanger 624 warms polishing liquid 616 to maintain an identical temperature to the exiting syngas from condenser 250. Thermal energy is provided to heat exchanger 624 using a hot heat transfer fluid 620 and a returning cool heat transfer fluid 622. A warm polishing liquid 602 mixes with a dry syngas 601 from conduit 260 prior to entering a rotary polisher 604.

Liquid and gas (i.e., warm polishing liquid 602 and dry syngas 601 enter rotary polisher 604, where the liquid is mechanically accelerated to high velocity. High velocity liquid impinges on the relatively static gas, resulting in a significant momentum exchange that drives tar low dew point tar aerosols and particulates out of the gas and into the polishing liquid. The mixture of syngas and polisher liquid exit the rotary polisher in conduit 606 and enter cyclonic separator 610, where the polishing liquid 612 is cyclonically separated from the syngas. A syngas 626, free of tars and particulates, exits cyclonic separator 610 through conduit 264. Tars and particulates agglomerate in the bottom of cyclonic separator 610 and are eventually captured in strainer 614.

Figure 13:
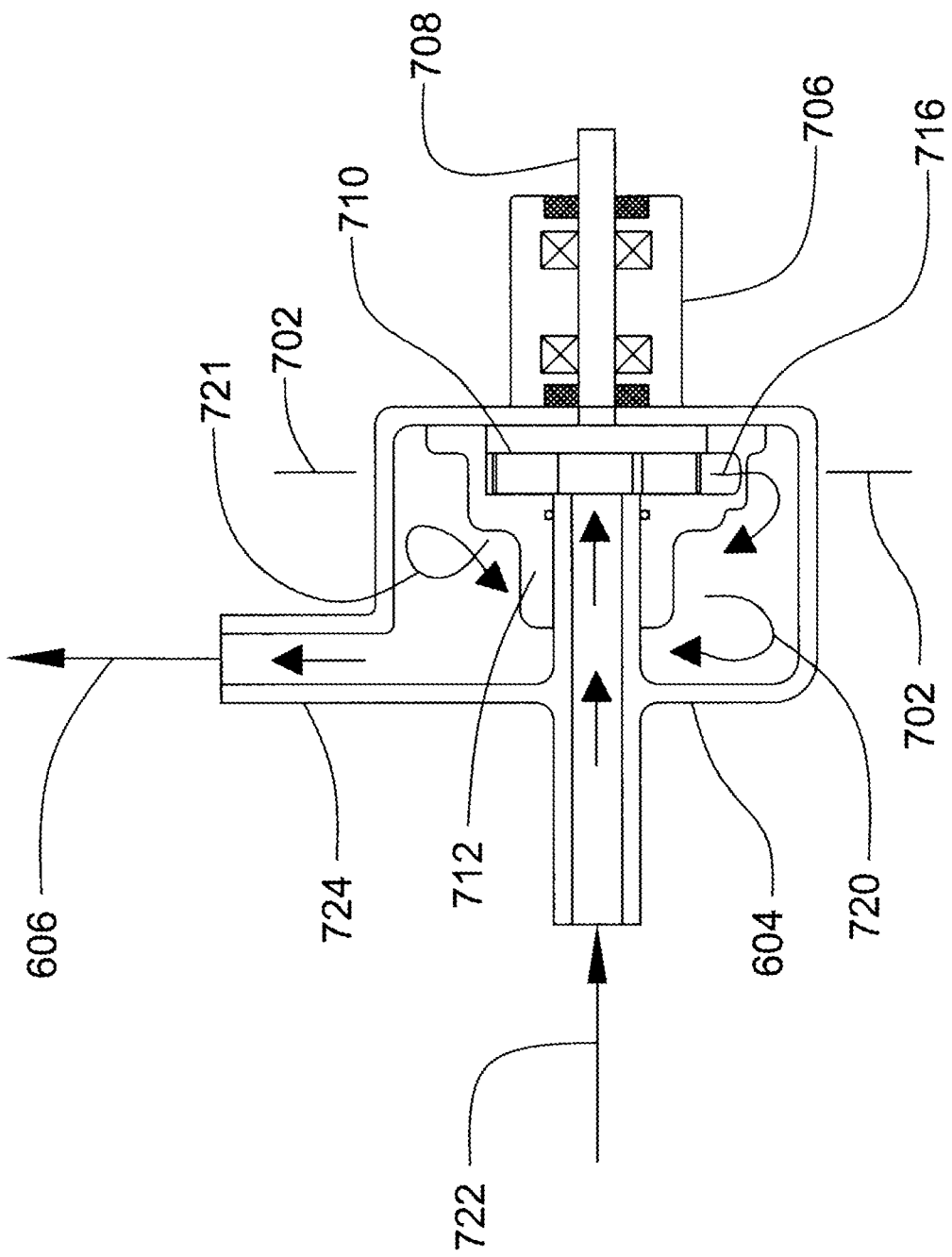
FIG. 13 is a side cross sectional view of the polisher of FIG. 12.
Figure 14:
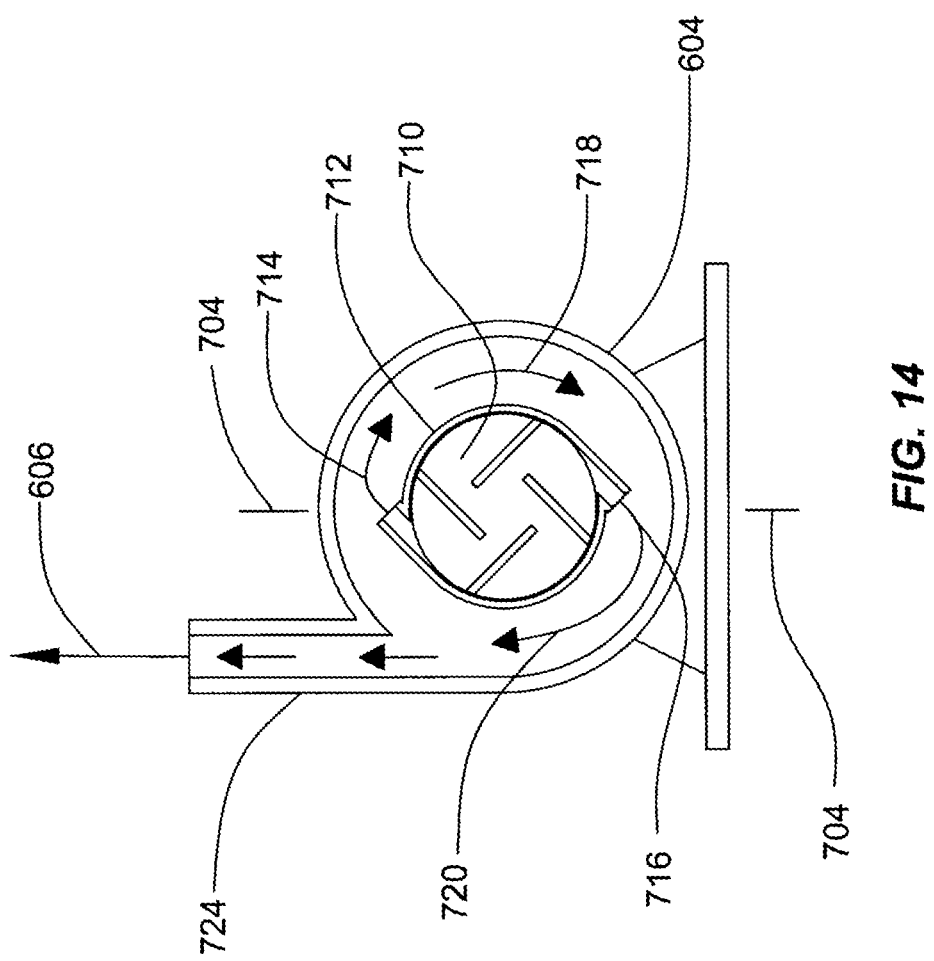
FIG. 14 is a front cross sectional view of the polisher of FIG. 12.

FIGS. 13 and 14 depict internal components of rotary polisher 604. FIG. 13 is a side cross sectional view 704 of polisher 604 of FIG. 12 while FIG. 14 is a front cross sectional view 702 of polisher 604. Syngas and a polishing liquid (i.e., warm polishing liquid 602 and dry syngas enter polisher 604 as a mixture 722 and directly hit a face of a rotating impellor 710. A shaft 708 is driven by a rotary motor (not shown) and is supported and sealed by bearing housing 706. Polishing liquid is mechanically slung into the relatively static syngas stream at high momentum exchange within flute housing 712 by impeller 710. A syngas 601 and a polishing liquid 602 exit flute housing 712 by two or more tangential outlets 714 and 716. A mixture of syngas 601 and polishing liquid 602 cyclonically rotates (718, 720, & 721) within the polisher housing to provide additional washing of syngas by momentum exchange prior to exiting through a tangential outlet 724 and conduit 606.

Clean polished syngas exits the glycol separator saturated and enters the gas reheater 266 using conduit 264. Reheater 266 is heats the syngas to at least 30 degrees F. above the dew point to avoid liquid water condensing within exit conduit 268. Gas exits reheater 266 at approximately 50% relative humidity.

As described above, the feedstock or waste received in reactor 15 may be formed of waste with a mix similar to that of municipal solid waste or could have another mix. An example of the components of a typical wastestream that could be utilized as a feedstock is provided in FIG. 9. The mix typical for municipal solid waste used in the described process provides oil (e.g., biocrude) from quencher 220 which may be input into reactor 15 which is more advantageous relative to an amount of syngas produced relative to a waste having less petroleum product (e.g., plastics) content. Alternatively, any other material possessing an energy value and capable of being gasified to a flammable gas may be used as the feedstock.

Figure 10:
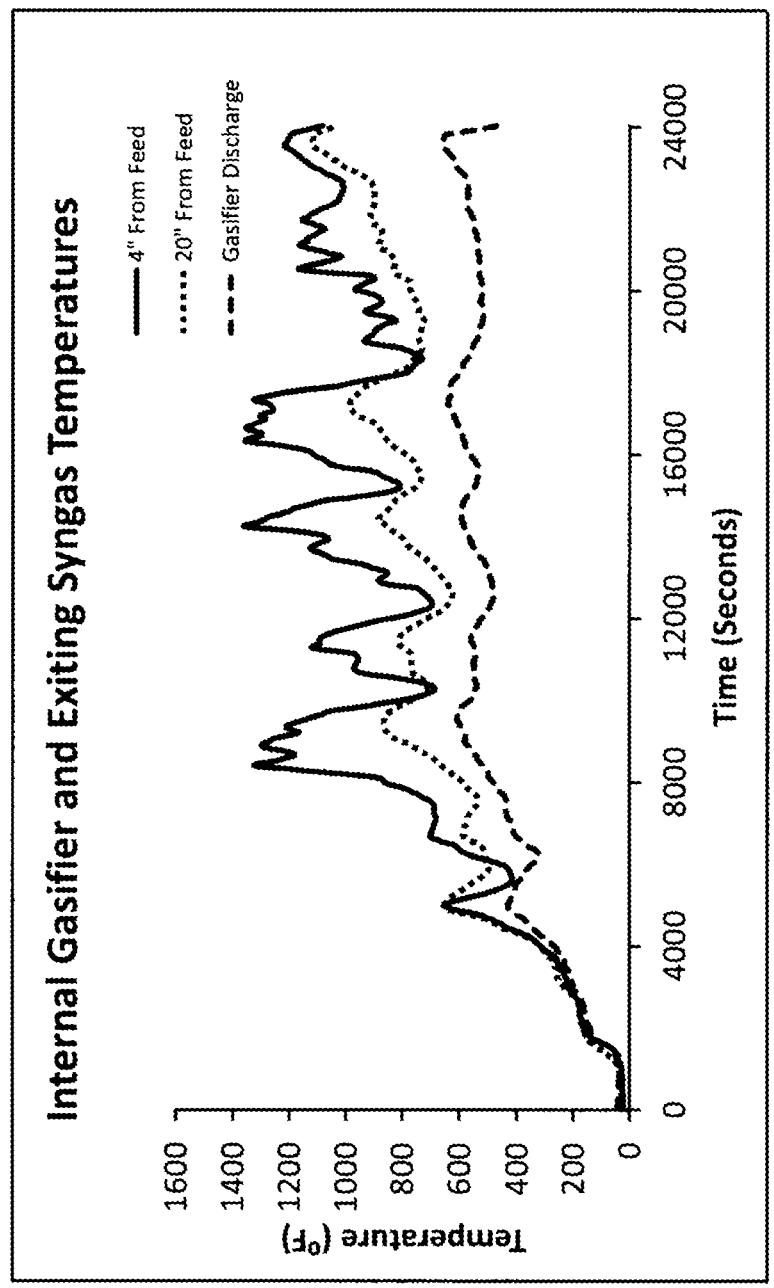
FIG. 10 is a line chart depicting temperatures of an example of a process utilizing the gasifier system of FIG. 1.

Further, control and monitoring of the gasification system described above could be performed using a Programmable Logic Controller (PLC). Continuous temperature and pressure data could be monitored at various locations in the system (e.g., within reactor 15 such as in container 20) and transmitted wirelessly to a standalone Personal Computer. In one example, as depicted in FIG. 10, temperature data was measured by thermocouples at 4" and 20" from a feed point and within gasifier exit conduit 134. Temperatures within the reactor may vary throughout a particular time period run and such temperatures may be used as an indicator to adjust a feed rate of a reactor (e.g., reactor 15). When using a PLC as described above, at points in time when a temperature within a reactor dips, a reactor may signal that additional feed (i.e., feedstock or waste) should be supplied. In the example using the waste of FIG. 9 and temperatures of FIG. 10, temperatures in a combustion bed (e.g., annulus 120) were measured using a probe to be as much as 2200 deg. F. Thermocouples placed along the longitudinal centerline of the reactor indicated that the temperatures drop at the reactor exit point to between 400 and 500 deg. F as indicated in FIG. 10.

Figure 15:
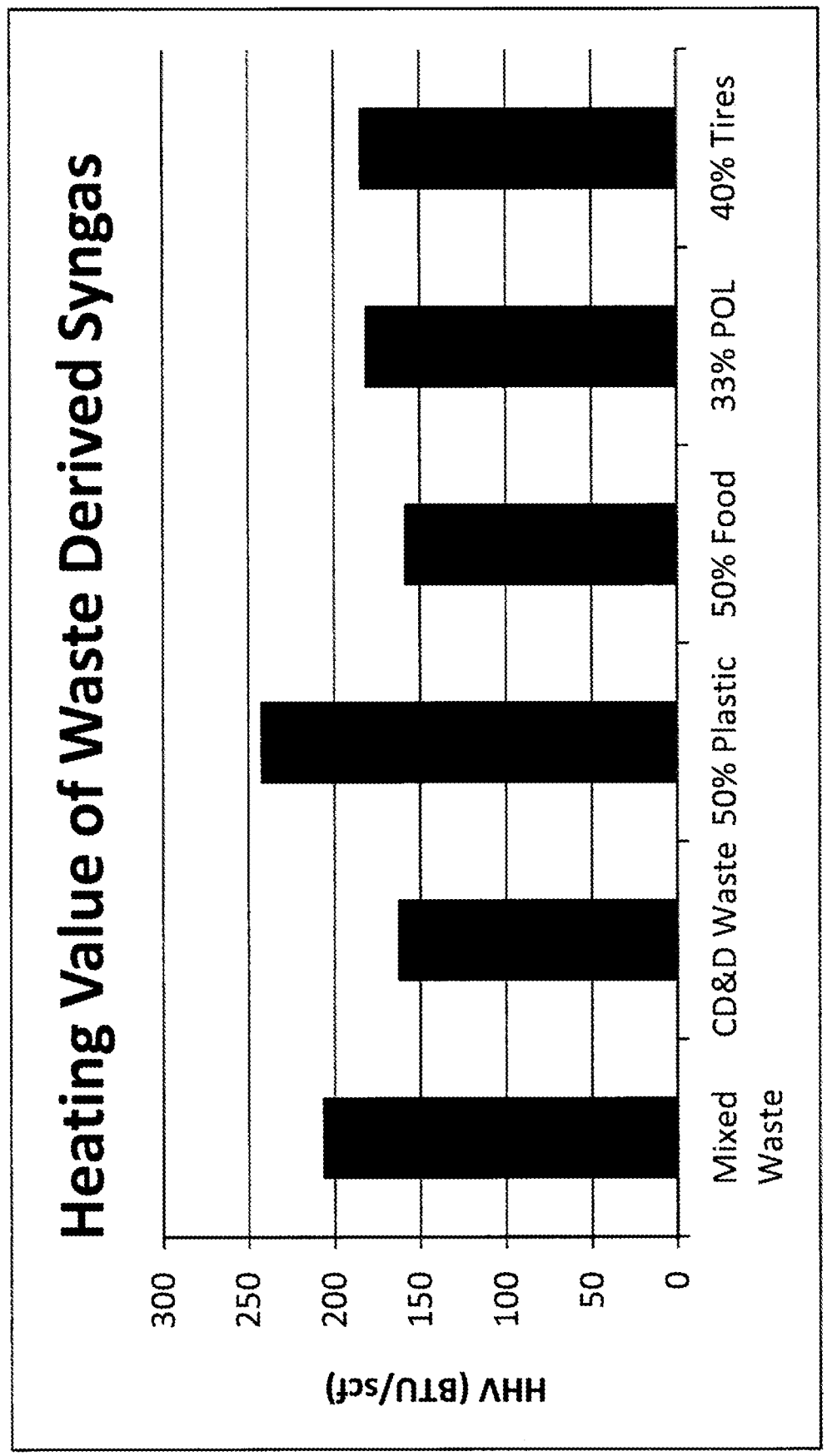
FIG. 15 is a bar chart depicting heating values for syngas produced using the gasifier system of FIG. 1.

As described above, syngas produced by the systems and methods described herein may be mixed with diesel fuel at a ratio of up to 80% syngas and 20% diesel fuel to power a diesel engine to produce electricity in remote locations, for example. A spark ignition internal combustion engine (Otto cycle) can operate on 100% syngas, depending on the type of feedstock processed. The syngas produced is similar to natural gas and can be used to fuel a variety of devices (boilers, heaters, etc.) that currently operate on gaseous fuels. The syngas produced has a high heating value with a flammability limit that sustains combustion with minimal flame separation, i.e., a high heating value (HHV) of about 100 to 110 BTU/scf. Anything higher than this will sustain combustion reliably. Flame temperatures similar to natural gas (>1700 deg. F) were observed when combusting syngas with a HHV of 145 BTU/scf. Examples of such heating values for syngas produced using the systems and methods described above using different wastes are depicted in FIG. 15.

Further, the waste reduction systems and methods described herein may be utilized to generate electricity and reduce a volume of waste, for example, from a wet feedstock such as a waste stream at a forward military installation. Also, possible uses within the private sector could be handling waste relative disaster relief efforts, distributed power generation, municipal solid waste reduction, biomass energy projects, agricultural waste conversion, and large scale power generation using integrated gasification combined cycle.

Also, although the above described process includes a step of densifying a feedstock prior to it entering interior 114, the feedstock may have a moisture content of up to 50 percent prior the feedstock entering interior 114. Such waste could start out at such a moisture percentage or it could have its moisture reduced (e.g., from up to 75 percent moisture on a wet basis) using a compressor (e.g., piston 70 or ram) or other mechanism.

While several aspects of the present invention have been described and depicted herein, alternative aspects may be effected by those skilled in the art to accomplish the same objectives.

The invention claimed is:

1. A gasifier system comprising:
a reactor for receiving a wet feedstock, said reactor comprising a base and a container rotatably connected to said base such that a rotation of said container causes mixing of the feedstock in an interior of the reactor, the interior bounded by said base and said container;
a space between said base and said container to allow an entry of oxygen into said interior during a rotation of said container relative to said base, said space having a dimension such that the feedstock is fully oxidized in a combustion area adjacent said base and such that the feedstock avoids combustion in a remainder of said interior;
said reactor having a longitudinal axis inclined at an inclination angle greater than 22 degrees relative to a horizontal line during the rotation to promote the mixing of the feedstock in the interior;
said base located at a bottom end of said container during the rotation; and
wherein said combustion area comprises a fixed carbon annulus between a nozzle of said base and said container, said annulus configured to accumulate partially reacted feedstock such that the partially reacted feedstock provides a seal between said nozzle and said container.

2. The system of claim 1, wherein said base comprises a self-locating floating plate configured to retain combusting feedstock within the rotating reactor.

3. The system of claim 2, wherein said self-locating floating plate is openable relative to the reactor to allow a withdrawal of an excessive amount of fully combusted feedstock and non-combustible items mixed with the feedstock.

4. The system of claim 1, wherein said base comprises an oil input having an outlet into said interior located above the combustion area, the input coupled to a source of the oil and configured to flow the oil therethrough during the rotation.

5. The system of claim 4, wherein said reactor is coupled to a quencher to allow a syngas produced in the reactor to flow to said quencher, said quencher comprising an oil output, said oil output being the source of the oil coupled to said oil input.

6. The system of claim 1, wherein said base comprises a syngas output conduit that extends into the rotatable container substantially above a mixing layer of the feedstock.

7. The system of claim 6, further comprising an oil input conduit that extends a length of the syngas outlet conduit, said oil input conduit providing a continual flushing (cleaning) and cooling of the syngas outlet conduit.

8. The system of claim 1, further comprising an outer casing having an inner surface, said inner surface and an outer surface of said reactor bounding a temperature control cavity coupled to a source of heated gas such that a gas fed into said container controls a temperature of said container.

9. The system of claim 1, wherein said base comprises a feedstock input having an outlet for the feedstock into said interior located above the combustion area, the input coupled to a source of the feedstock and configured to flow the feedstock therethrough during the rotation.

10. The system of claim 1, wherein said container comprises a wall and a top, said container being continuous and airtight.

11. The system of claim 1, further comprising a supply of water coupled to said space and a pump, said pump configured to pump the water through said space to convert the water into flammable gas.

12. A gasifier system comprising:
- a reactor for receiving a feedstock, said reactor comprising a base and a container rotatably connected to said base such that a rotation of said container causes mixing of the feedstock in an interior of the reactor, the interior bounded by said base and said container;
- a space between said base and said container to allow an entry of oxygen into said interior, said space having a dimension such that the feedstock is fully oxidized in a combustion area adjacent said base and such that the feedstock avoids combustion in a remainder of said interior;
- said reactor having a longitudinal axis inclined at an inclination angle greater than 22 degrees relative to a horizontal line to promote the mixing of the feedstock in the interior; and
- wherein said combustion area comprises a fixed carbon annulus between a nozzle of said base and said container, said annulus configured to accumulate partially reacted feedstock such that the partially reacted feedstock provides a seal between said nozzle and said container.

* * * * *